(12) United States Patent
Agrawal et al.

(10) Patent No.: US 11,062,493 B1
(45) Date of Patent: Jul. 13, 2021

(54) SYMMETRY AXIS DIGITAL CONTENT GENERATION SYSTEM

(71) Applicant: Adobe Inc., San Jose, CA (US)

(72) Inventors: Vivek Agrawal, Noida (IN); Radhika Jhawar, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/021,465

(22) Filed: Sep. 15, 2020

(51) Int. Cl.
*G06T 11/60* (2006.01)
*G06F 3/0484* (2013.01)
*G06T 11/20* (2006.01)

(52) U.S. Cl.
CPC .......... *G06T 11/60* (2013.01); *G06F 3/04845* (2013.01); *G06T 11/203* (2013.01)

(58) Field of Classification Search
CPC ........ G06T 11/00; G06T 11/20; G06T 11/203; G06T 11/60; G06T 11/80; G06T 13/00; G06F 3/00; G06F 3/048; G06F 3/0481; G06F 3/04812; G06F 3/04845
USPC ........................................................ 345/619
See application file for complete search history.

(56) References Cited

U.S. PATENT DOCUMENTS

| | | | | |
|---|---|---|---|---|
| 6,018,352 | A * | 1/2000 | Saito ..................... | G06T 11/203 345/678 |
| 10,282,086 | B2 * | 5/2019 | Hinckley ............ | G06F 3/04883 |
| 2005/0248585 | A1 * | 11/2005 | Inoue ..................... | G06T 3/606 345/619 |
| 2009/0251492 | A1 * | 10/2009 | Ohnishi ................. | G06T 11/60 345/676 |
| 2012/0056828 | A1 * | 3/2012 | Miyazaki ............... | G06T 13/80 345/173 |
| 2016/0342326 | A1 * | 11/2016 | Hinckley ............ | G06F 3/04842 |

* cited by examiner

*Primary Examiner* — Sae Won Yoon
(74) *Attorney, Agent, or Firm* — FIG. 1 Patents

(57) ABSTRACT

Symmetry axis digital content generation techniques and systems are described that support diverse types of art included in the digital content and may do so in real time as part of creating and editing symmetry art. A symmetry art generation system determines a portion of the source object, defined as encompassed by a path, that is to be reflected to generate the reflected object. As a result, the symmetry art generation system involves a reduced number of low-cost computations in order to calculate the path. The path also defines a minimized area defining a relevant portion of the source object to be reflected and thus reduces computational resource consumption by a computing device that implements these techniques and works for a wide range of art types.

20 Claims, 12 Drawing Sheets

SYMMETRY AXIS DIGITAL CONTENT GENERATION SYSTEM

BACKGROUND

Digital content generation systems as implemented by computing devices are continually evolving to support a wide variety of art types. For example, a digital content generation system may support generation of digital content to include raster objects, text objects, fonts, symbols, patterns, vector objects, and so forth. Further, resolutions supported by the digital content continues to increase, resulting in the consumption of tens and even hundreds of gigabytes of data for a single item of digital content.

However, this increase in types of digital content in conjunction with the memory storage requirements associated with the digital content present challenges in further developing techniques to create and edit digital content. As a result, conventional techniques are often limited to addressing a single type of digital content, do not support real time operation, and so forth. This burdens the computational resources of computing devices that implement these techniques as well as resulting in inefficient user interaction with the computing device and user frustration to create and edit digital content.

SUMMARY

Symmetry axis digital content generation techniques and systems are described that overcome these challenges to support diverse types of art included in the digital content and may do so in real time as part of creating and editing symmetry art. Symmetry art (also known as mirror art), as implemented by a symmetry art generation system, includes a source object and a symmetry axis in a user interface. The symmetry axis is configured to act as a mirror by the system to generate a reflected object that is displayed along with the source object to create the symmetry art in a user interface. This may be performed for a single axis and is also applicable for multiple axes, e.g., axis-aligned, rotated, intersecting, parallel, and so forth.

When the source object does not intersect the symmetry axis in the user interface, the symmetry art generation system employs an entirety of the source object to generate the reflected object. When the source object does intersect the symmetry axis in the user interface, the symmetry art generation system generates the symmetry art, in which, a portion of the source object on an opposing side of the symmetry axis is removed, and a remaining portion of the source object is reflected across the symmetry axis to generate the reflected object.

To do so, the symmetry art generation system determines a portion of the source object, defined as encompassed by a path, that is to be reflected to generate the reflected object. As a result, the symmetry art generation system involves a reduced number of low-cost computations in order to calculate the path. The path also defines a minimized area defining a relevant portion of the source object to be reflected and thus reduces computational resource consumption by a computing device that implements these techniques and works for a wide range of art types.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
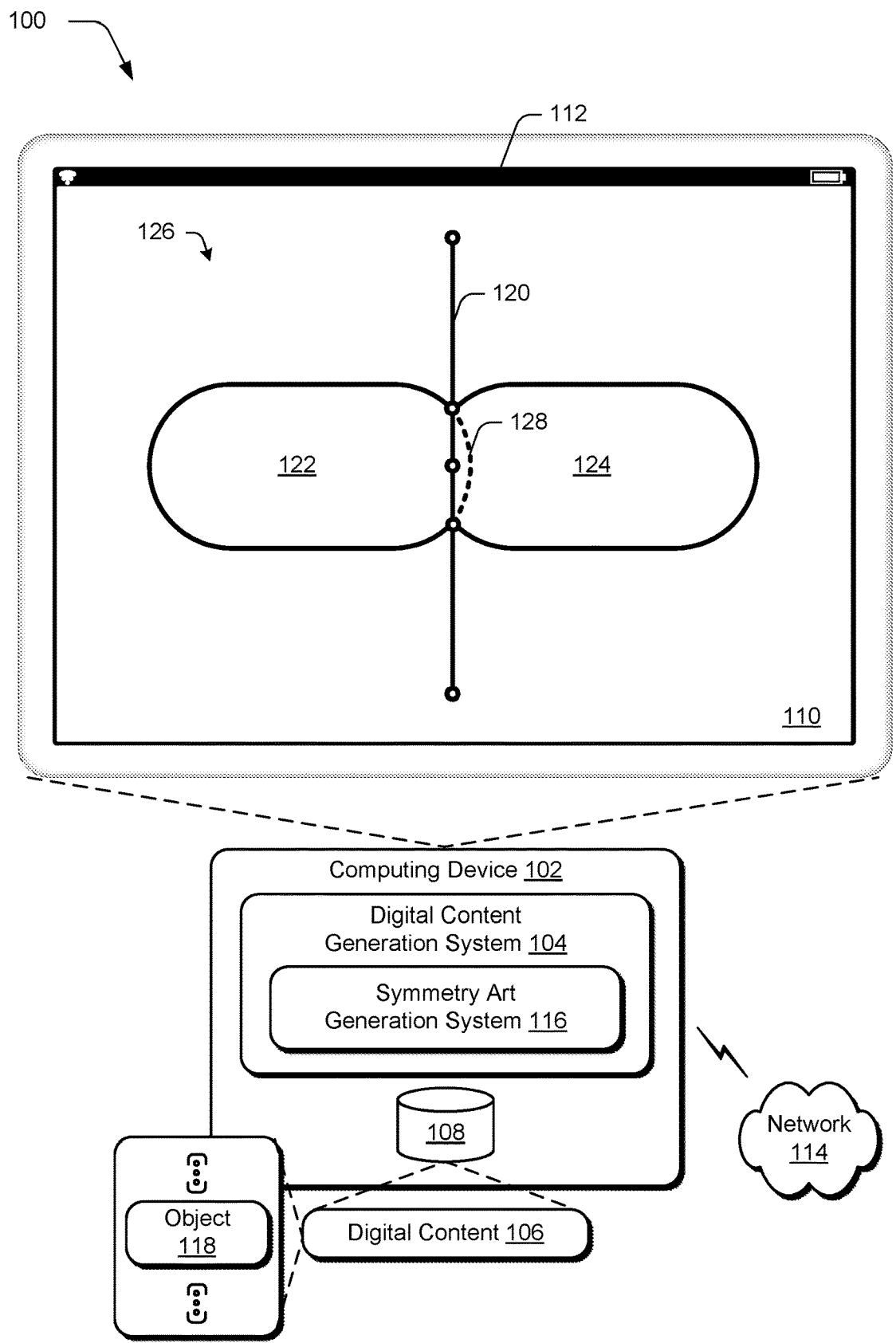
FIG. 1 is an illustration of a digital medium environment in an example implementation that is operable to employ symmetry axis digital content generation techniques described herein.

Digital content generation systems as implemented by computing devices are faced with numerous challenges in developing and implementing techniques to generate digital content. These challenges include a variety of types of art that may be included even in a single item of digital content, computational resource consumption involved in storing, processing, and communicating the digital content, and so forth. Accordingly, conventional systems are typically limited to single types of art and do not support real time implementation.

Accordingly, symmetry axis digital content generation techniques and systems are described that overcome these challenges to support diverse types of art included in the digital content and may do so in real time as part of creating and editing symmetry art. Symmetry art (also known as mirror art), as implemented by a digital content generation system, includes a source object and a symmetry axis defined with respect to each other in a user interface.

The symmetry axis is configured to act as a mirror by the system to generate a reflected object that is displayed along with the source object to create the symmetry art. This may be performed for a single axis and is also applicable for multiple axes, e.g., axis-aligned, rotated, intersecting, parallel, and so forth. Therefore, when the source object does not intersect the symmetry axis in the user interface, the system employs an entirety of the source object to generate the reflected object. When the source object does intersect the symmetry axis in the user interface, the system generates the symmetry art, in which, a portion of the source object on an opposing side of the symmetry axis is removed, and a remaining portion of the source object is reflected across the symmetry axis to generate the reflected object.

In examples described herein, a symmetry art generation system is configured to generate symmetry art in a manner that improves operation of a computing device that implements these techniques to support a wide variety of types of art, reduces computational resource consumption, and improves computing device performance to support real time output. The system, for instance, displays a user interface as part of creating digital content. The user interface includes a source object and a symmetry axis defined in relation to the source object. The system, for instance, receives user inputs to specify a location, size, and type of the source object (e.g., raster, vector) as well as to define a symmetry axis. As previously described, the symmetry axis is implemented to mimic a mirror to cause the system to generate a reflected object on an opposing side of the symmetry axis in the user interface.

To do so, the symmetry art generation system is configured to determine a portion of the source object, defined as encompassed by a path, that is to be reflected to generate the reflected object. As a result, the symmetry art generation system involves a reduced number of low-cost computations in order to calculate the path. The path also defines a minimized area defining a relevant portion of the source object to be reflected and thus reduces computational resource consumption by a computing device that implements these techniques and works for a wide range of art types, which is not possible in other techniques as further described below.

In one example, a bounding area is calculated by the symmetry art generation system that contains the source object. The bounding area, for instance, is computed by the system as a set of X and Y coordinates that specify a bounding box that contains the source object in the user interface, e.g., as part of a canvas, digital image, etc. Other examples include edge detection as implemented using machine learning. The symmetry axis is also defined with respect to the digital content, e.g., through use of a defined axis center and axis rotation angle.

Based on this, a path is calculated by the system based on a relationship of the bounding area of the source object to the symmetry axis. The system, for instance, first determines whether the symmetry axis intersects the bounding area. If the symmetry axis does not intersect the bounding area, the bounding area is used as the path by the system, which includes an entirety of the source object. The system then generates the reflected object by reflecting the source object with respect to the symmetry axis at a corresponding location at an opposing side of the axis. As a result, the symmetry art as rendered in the user interface by the system includes the source object and the reflected object as displayed in the user interface.

If the symmetry axis does intersect the bounding area, the system determines whether the symmetry axis intersects the source object within the bounding area. Continuing with the example above, suppose the source object is a circle that is contained within a bounding box. Although an entirety of the source object is included within the bounding box, the bounding box also includes other portions of the user interface (e.g., digital content, canvas) that are not included as part of the source object, e.g., at corners of the box. Accordingly, if the symmetry axis does not intersect the source object, the bounding area is also used as the path by the system, which includes an entirety of the source object. The system then generates the reflected object by reflecting the source object with respect to the symmetry axis as described above. As a result, the symmetry art as rendered in the user interface by the system includes the source object and the reflected object as displayed in the user interface.

If the symmetry axis does intersect the source object, the symmetry art generate system generates a path based on the intersection of the symmetry axis with the bounding area. The path, for example, is implemented as a clipping path that defines a closed vector path or shape that includes the portion of the source object that is to be reflected to generate the reflected object, e.g., through use of a clipping window defined by the path. As a result, the path reduces an amount of data processed by the system to generate the reflected object and may do so as user inputs are received in real time, e.g., involving movement of the source object or the symmetry axis. A variety of techniques are employable by the symmetry art generation system to calculate this path, including use of rotation angle of the symmetry axis, rotation angle of the source object, In this way, the system overcomes numerous challenges faced as part of implementing this functionality, including consumption of computational resources, scalability, and so forth. In a first example, a technique may be employed in which Bezier paths of the source object are intersected with the symmetry axis, and other portions of the source object are removed. This example, however, is limited to Bezier paths and thus is not applicable to other types of objects such as raster objects, groups, text object, symbols, plugin objects, effects, patterns, and so forth. Additionally, complex Bezier paths having a large number of anchor points involve significant consumption of computation resources in order to determine an intersection between the source object and the symmetry axis, which limits this from being performed in real time in some instance. Further, once intersected and removed, the original source object is lost and therefore a further ability to move the source object is also lost. Storing an additional copy of the source object is also memory intensive, especially for instances in which the paths are complex, the source object includes numerous paths, and so forth.

In another example, one side of the symmetry axis as displayed in a user interface is treated as the path. However, successful operation in this example is limited to instances in which the source object is completely viewable in the user interface, and thus may result in inaccuracies in other scenarios because portions of the source object that lie outside the user interface are not reflected.

To address this, a portion of the digital content (e.g., canvas) included on one side of the symmetry access may be treated as the path and used to generate the reflected object. A challenge with this approach is that a canvas implementing the digital content may be large, e.g., have a size of 16,383 pt by 16,383 pt. When the canvas is completely "zoomed out" in the user interface, the path has a size of the screen size. At a 100% zoom level, a single point represents a single pixel, at a 400% zoom level a single point represents four pixels, and so on. In such instances, a size of the clipping path becomes too large to be rendered by the computing device and is precluded from real time operation. As a result, a buffer allocation for rendering the clipping path leads to a significant memory footprint and may cause operation of the computing device to cease, e.g., the application to terminate, especially for computing devices having limited amounts of computational resources, e.g., tablet computers.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ symmetry axis digital content generation techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to low-resource devices with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 16.

The computing device 102 is illustrated as including a digital content generation system 104. The digital content generation system 104 is implemented at least partially in hardware of the computing device 102 to process and transform digital content 106, which is illustrated as maintained in a storage device 108 of the computing device 102. Such processing includes creation of the digital content 106, modification of the digital content 106, and rendering of the digital content 106 in a user interface 110 for output, e.g., by a display device 112. Digital content 106 is configurable in a variety of ways, including as a digital image, digital document, digital media, digital video, digital drawings, and so forth. Although illustrated as implemented locally at the computing device 102, functionality of the digital content generation system 104 may also be implemented as whole or part via functionality available via the network 114, such as part of a web service or "in the cloud."

An example of functionality incorporated by the digital content generation system 104 to process the digital content 106 is depicted as a symmetry art generation system 116. The symmetry art generation system 116, as implemented by the computing device 102, employs one or more objects 118 (e.g., raster objects, vector objects, graphical elements, text, emojis, etc.) included in the digital content 106 to generate symmetry art for display in the user interface 110, e.g., as part of the digital content 106. In the illustrated example, the user interface 110 includes a symmetry axis 120 and a source object 122.

The symmetry axis 120 is implemented by the system to mimic a mirror such that a portion of the source object 122 disposed on one side of the symmetry axis 120 is reflected on an opposing side of the symmetry axis 120 to generate a reflected object 124 as the symmetry art 126. In one example, the symmetry art generation system 116 copies pixels from a first portion of the source object on the first side of the symmetry axis 120, but not pixels corresponding to a second portion 128 of the source object 122 disposed on a second side of the symmetry axis 120 opposite to the first side. In this way, the symmetry art generation system 116 expands functionality of the digital content generation system 104 to support generation of a new type of art.

As previously described, generation of the symmetry art 126 is confronted with numerous challenges that otherwise could hinder operation of the computing device 102 and cause a diminished user experience, including application failure. Accordingly, techniques are described in the following sections that address these challenges to improve operation of a computing device through reduced computational resource consumption, support real time user interaction, and an improved user experience.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Symmetry Axis Digital Content Generation

Figure 2:
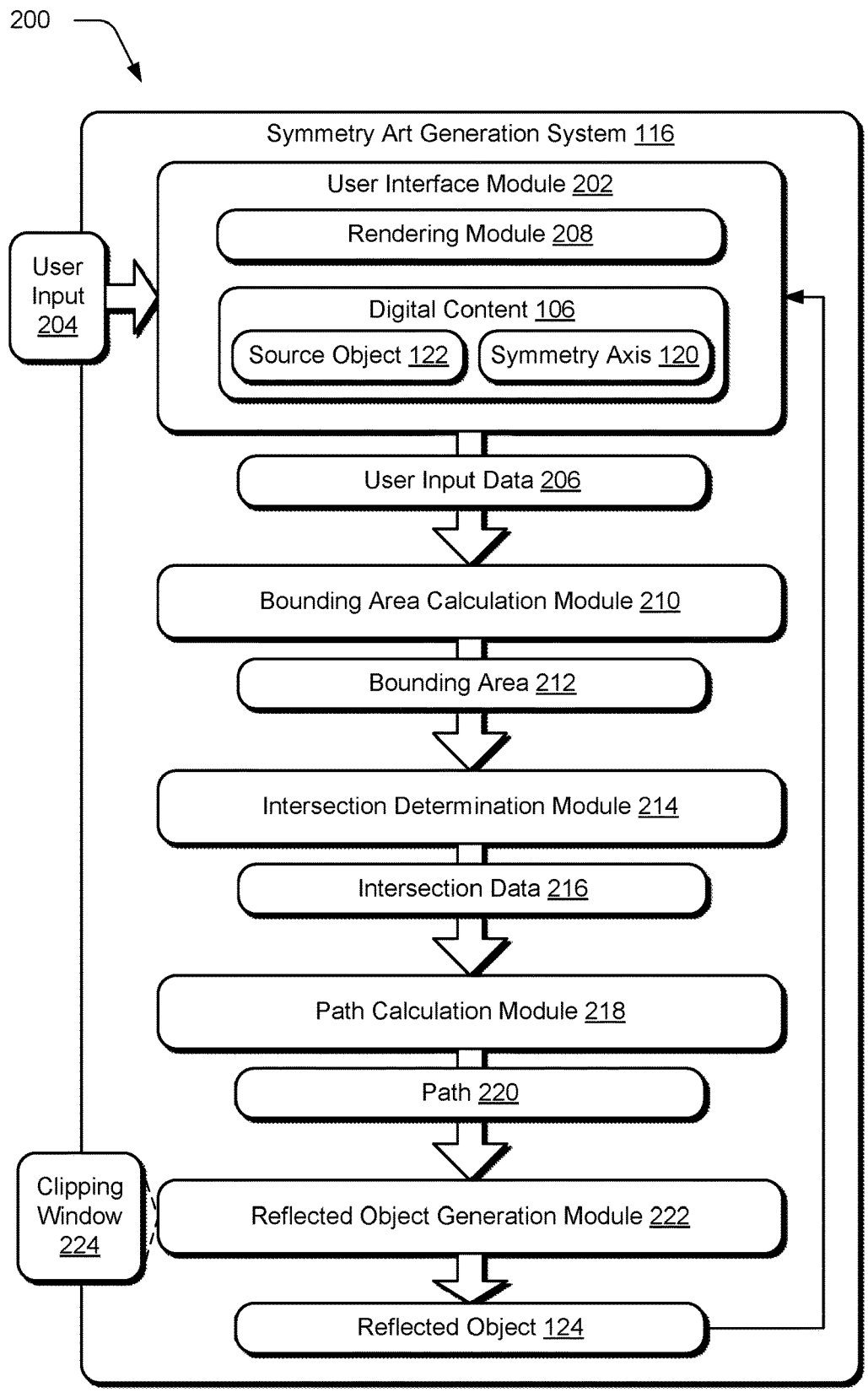
FIG. 2 depicts a system in an example implementation showing operation of a symmetry art generation system of FIG. 1 in greater detail as generating a reflected object based on a source object.
Figure 11:
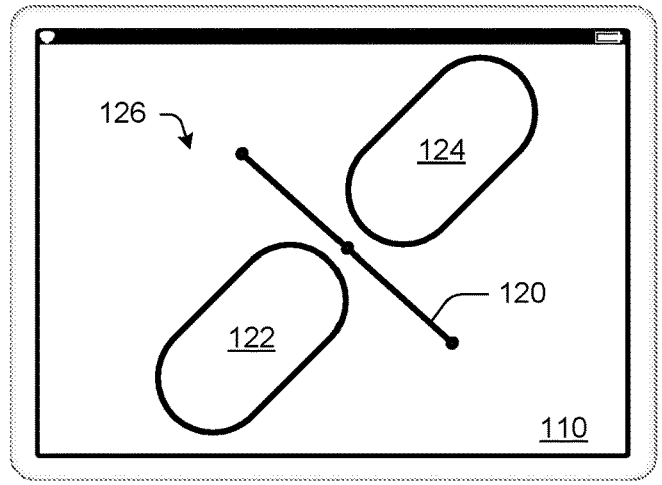
FIG. 11 depicts a system in an example of receipt of a user input and output of rotation of an entirety of the symmetry art in real time as a user input is received.
Figure 12:
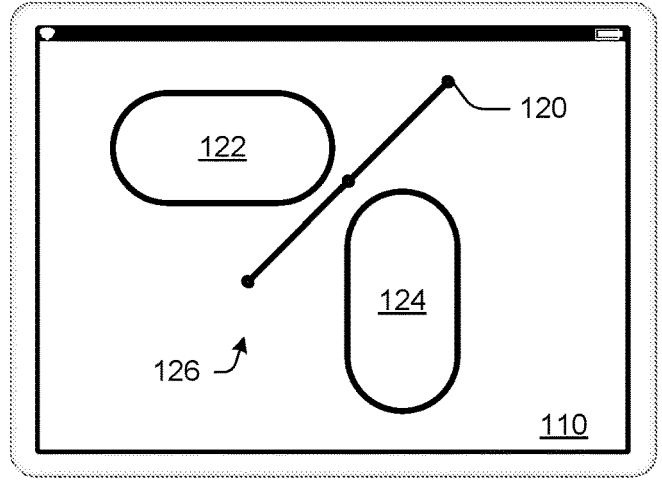
FIG. 12 depicts a system in an example of receipt of a user input and output of rotation of the symmetry axis and updating the source and reflected objects in real time as a user input is received.
Figure 13:
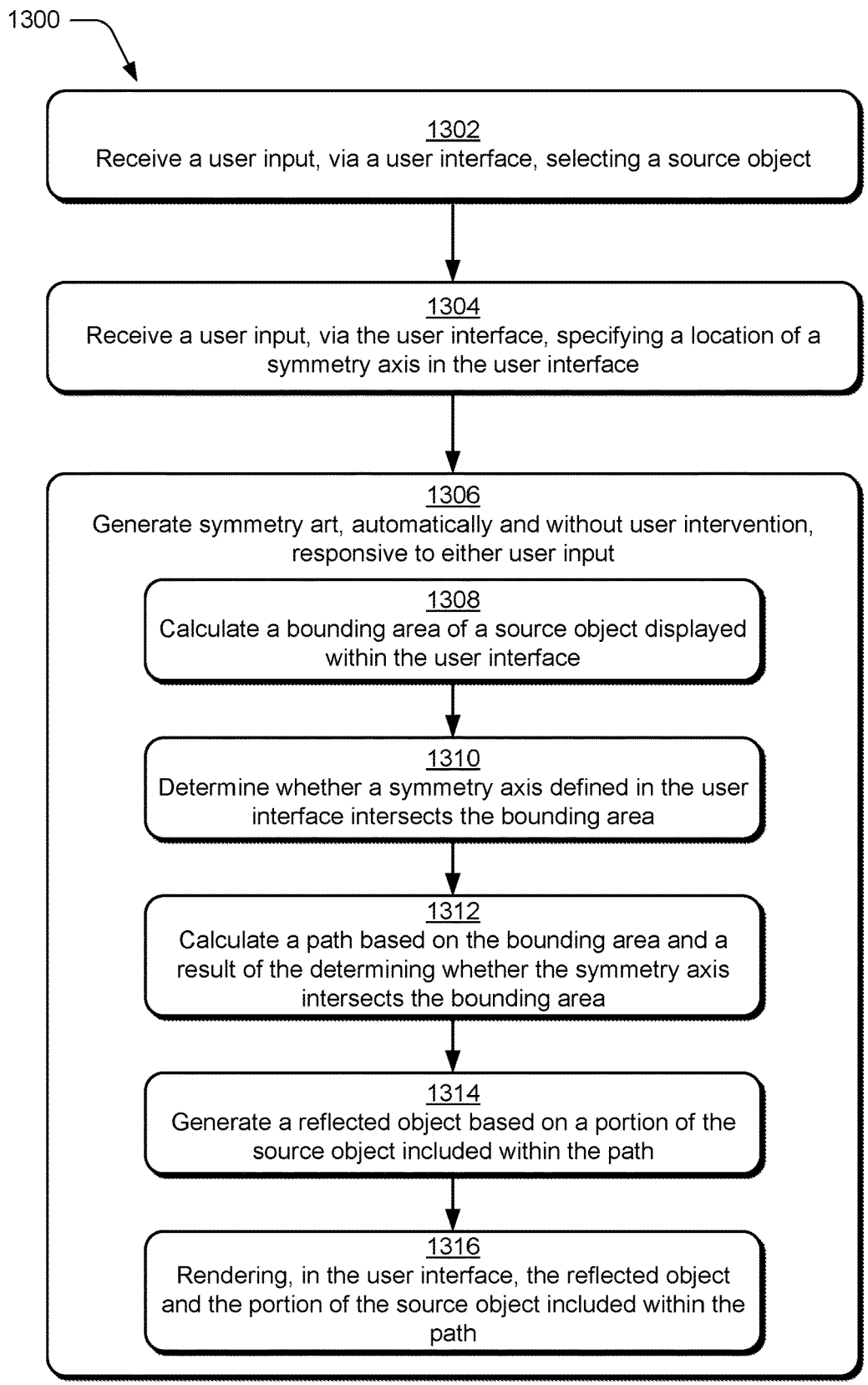
FIG. 13 is a flow diagram depicting a procedure in an example implementation of symmetry art generation.
Figure 14:
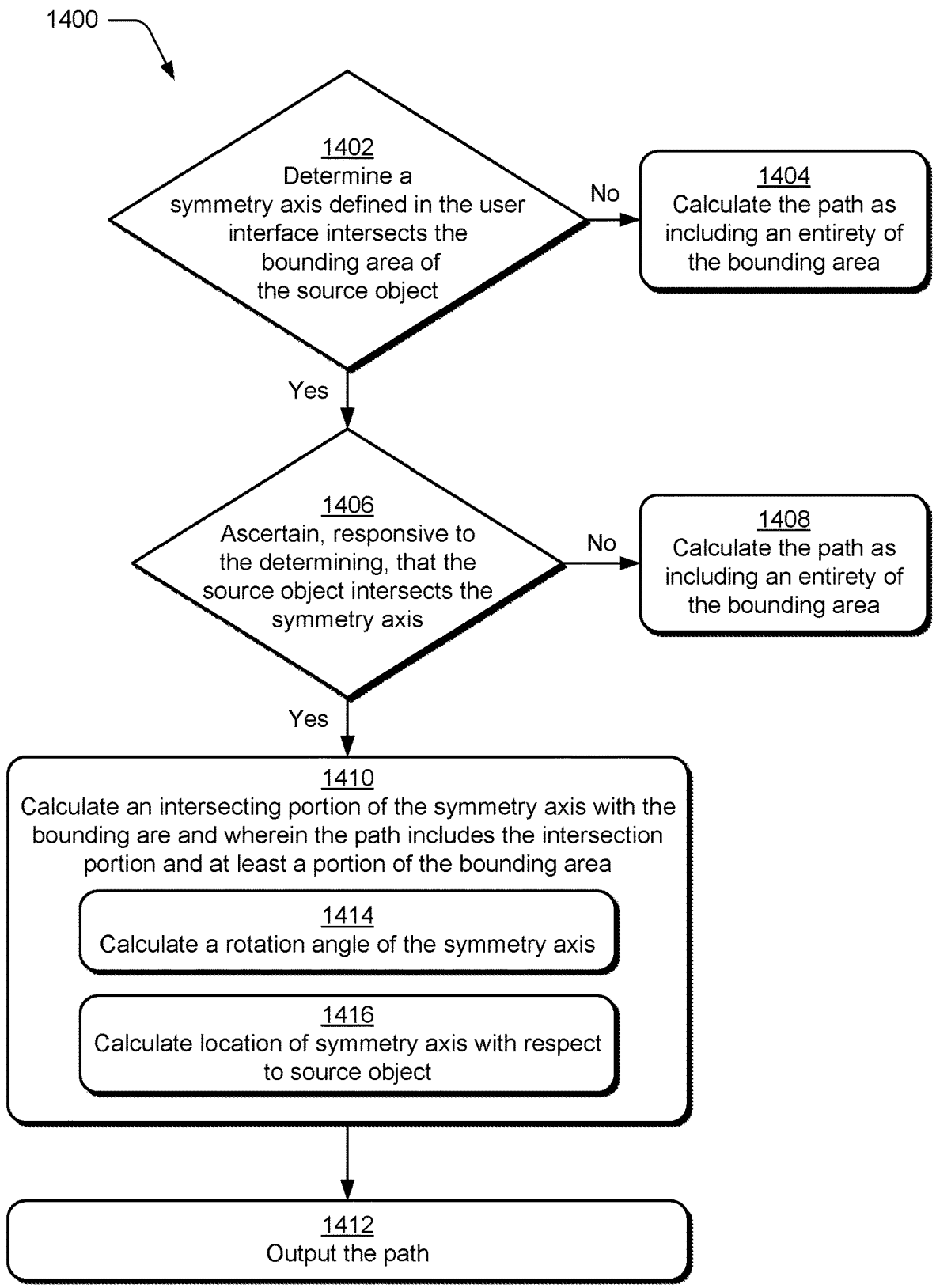
FIG. 14 is a flow diagram depicting a procedure in an example implementation depicting an intersection determination and path calculation in greater detail.
Figure 15:
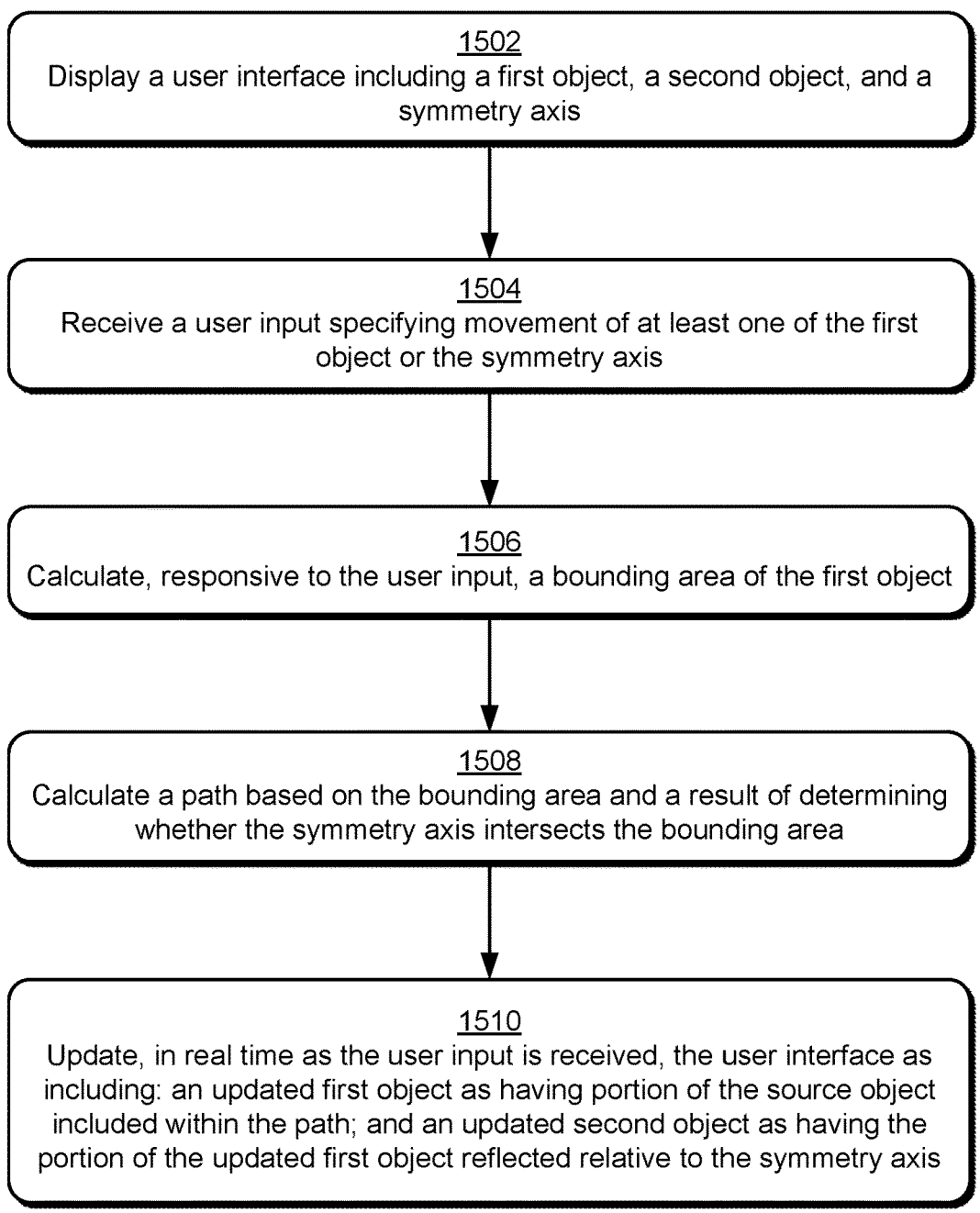
FIG. 15 is a flow diagram depicting a procedure in an example implementation of display of a user interface, receipt of a user input, and update of the user interface in real time as the user input is received.

FIG. 2 depicts a system 200 in an example implementation showing operation of a symmetry art generation system 116 of FIG. 1 in greater detail as generating a reflected object based on a source object. FIGS. 3-12 depict examples of symmetry art generation based on a relationship of a source object to a symmetry axis. FIG. 13 depicts a procedure 1300 in an example implementation of symmetry art generation. FIG. 14 depicts a procedure 1400 in an example implementation depicting an intersection determination and path calculation in greater detail. FIG. 15 depicts a procedure 1500 in an example implementation of display of a user interface, receipt of a user input, and update of the user interface in real time as the user input is received.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-15.

The symmetry art generation system 116, as depicted in greater detail in FIG. 2, is configured to generate symmetry art 126 based on a source object 122 and a symmetry axis 120 to generate a reflected object 124. The symmetry axis 120 is configured to act as a mirror by the symmetry art generation system 116. Therefore, when the source object 122 does not intersect the symmetry axis 120 in the user interface 110, the symmetry art generation system 116 employs an entirety of the source object 122 to generate the reflected object 124. When the source object 122 does intersect the symmetry axis 120 in the user interface 110, the system generates the symmetry art 126, in which, a portion 128 of the source object 122 on an opposing side of the symmetry axis 120 is removed, and a remaining portion of the source object 122 is reflected across the symmetry axis 120 to generate the reflected object 124.

In order to address the numerous challenges including size and types of objects that are included in the digital content 106 as well as support real time interaction as user inputs are received to specify and move the objects 118 and the symmetry axis 120, the symmetry art generation system 116 is configured to reduce an amount of data processed to generate the symmetry art 126. In this way, the symmetry art generation system 116 identifies which portion of a source object 122 is to be reflected to generate the reflected object 124 and minimize processing of portions of the digital content 106 that are not to be included as part of the reflected object 124.

In one example, this begins with receiving a user input, via a user interface 110, selecting a source object 122 (block 1302). The symmetry art generation system 116 includes a user interface module 202 configured to receive the user input 204 via the user interface 110 and generate user input data 206 based on the user input 204. The user input, for instance, is received via a cursor control device (e.g., mouse, trackpad), gesture, and so for that selects which object 118 of the digital content 106 rendered by a rendering module 208 of the user interface module 202 in the user interface 110 is to be processed as the source object 122. In another instance, the user input 204 includes creation of the source object 122, e.g., to draw a shape.

A user input 204 is also received in this example specifying a location of a symmetry axis 120 in the user interface 110 (block 1304). The user input 204, for instance, is also receivable through use of a cursor control device, gesture, and so forth to specify a location in the user interface 110 that is to act as the "mirror" to generate the reflected object 124. The symmetry axis 120 is definable in a variety of ways, such as through X and Y coordinates of a central handle and an angle of rotation, or any other way to define a line (e.g., curved or straight) in the user interface 110, which may also be performed for two or three dimensions.

In response, the symmetry art generation system 116 generates symmetry art 126 automatically and without further user interaction responsive to receipt of either user input (block 1306), e.g., responsive to receipt of the user input data 206. To do so, user input data 206 is received by a bounding area calculation module 210. The bounding area calculation module 210 is configured to calculate a bounding area 212 of a source object 122 displayed within the user interface (block 1308) based on this data. In one example, the bounding area 212 is calculated as a bounding box using X and Y coordinates of four points that contain an entirety of the source object 122. This is performable, for instance, by determining left-most, right-most, top-most, and bottom-most pixels of the source object 122 and then configuring corners the bounding box based on coordinates of those pixels. Other examples are also contemplated, such as edge detection of the source object 122 (e.g., using machine learning), and so forth.

The bounding area 212 is then passed from the bounding area calculation module 210 as an input to an intersection determination module 214. The intersection determination module 214 is configured to generate intersection data 216, which describes a result of a determination as to whether a symmetry axis 120 defined in the user interface 110 intersects the bounding area 212 (block 1310). As part of this, the intersection determination module 214 calculates an equation of a line defined by the symmetry axis 120, e.g., based on an axis center and axis rotation angle or any other way to define a line in a user interface.

From this, the intersection determination module 214 determines a relationship between the symmetry axis 120 and the bounding area 212. This includes whether the symmetry axis 120 intersects the bounding area 212, and whether the symmetry axis 120 intersects the source object 122 itself. If the intersection occurs, this also includes a determination as to how this intersection occurs, e.g., where it occurs in relation to the source object 122, an angle of this interaction by the source object 122 and/or the symmetry axis 120, and so on as further described in relation to FIG. 14. Thus, the intersection data 216 describes whether the intersection occurs, and if so, how this occurs.

The intersection data 216 is then passed from the intersection determination module 214 as an input to a path calculation module 218. The path calculation module 218 is configured to calculate a path 220 based on the bounding area 212 and a result of determining whether the symmetry axis intersects the bounding area (block 1312) as described by the intersection data 216. The path 220, for instance, is defined as a clipping path that defines a closed path (e.g., vector path or shape). The path 220 describes which portion of the bounding area 212, as defined by the intersection data 216, is disposed on a single side of the symmetry axis 120. This may include an entirety of the bounding area 212 in situations where the bounding area 212 and/or the source object 122 are not intersected by the symmetry axis 120 or a portion of the source object 122 as defined between the bounding area 212 and the symmetry axis 120. Examples of each of these situations is further described in relation to FIGS. 4-12.

The path 220, once generated, is passed from the path calculation module 218 to a reflected object generation module 222. The reflected object generation module 222 is configured to generate the reflected object 124 based on a portion of the source object 122 included within the path (block 1314). The reflected object and the portion of the source object 122 included within the path 220 is rendered in the user interface 110 (block 1316) as the symmetry art 126.

Continuing from the previous example, the path 220 is implemented as a clipping path using a closed vector path or shape that includes the portion of the source object that is to be reflected to generate the reflected object. The clipping path is then used to define a clipping window 224 that is used to selectively enable or disable rendering operations within a defined region of interest. Therefore, the reflected object generation module 220 is configured to render the reflected object 124 using pixels contained within the clipping window 224, and not render portions outside of this window and thus defines which pixels are "clipped" to generate the reflected object 124.

Generation of the intersection data 216 and calculation of the path 220 may encounter a variety of different scenarios having corresponding results. In a first example, a determination is made by the intersection determination module 214 that the symmetry axis 120 defined in the user interface 110 does not intersect the bounding area of the source object ("no" from decision block 1402). This determination is used as a basis to generate intersection data 216 indicating this, which is then passed to the path calculation module 218. In response, the path calculation module 218 calculates the path 220 as including an entirety of the bounding area 212 (block 1404).

Figure 3:
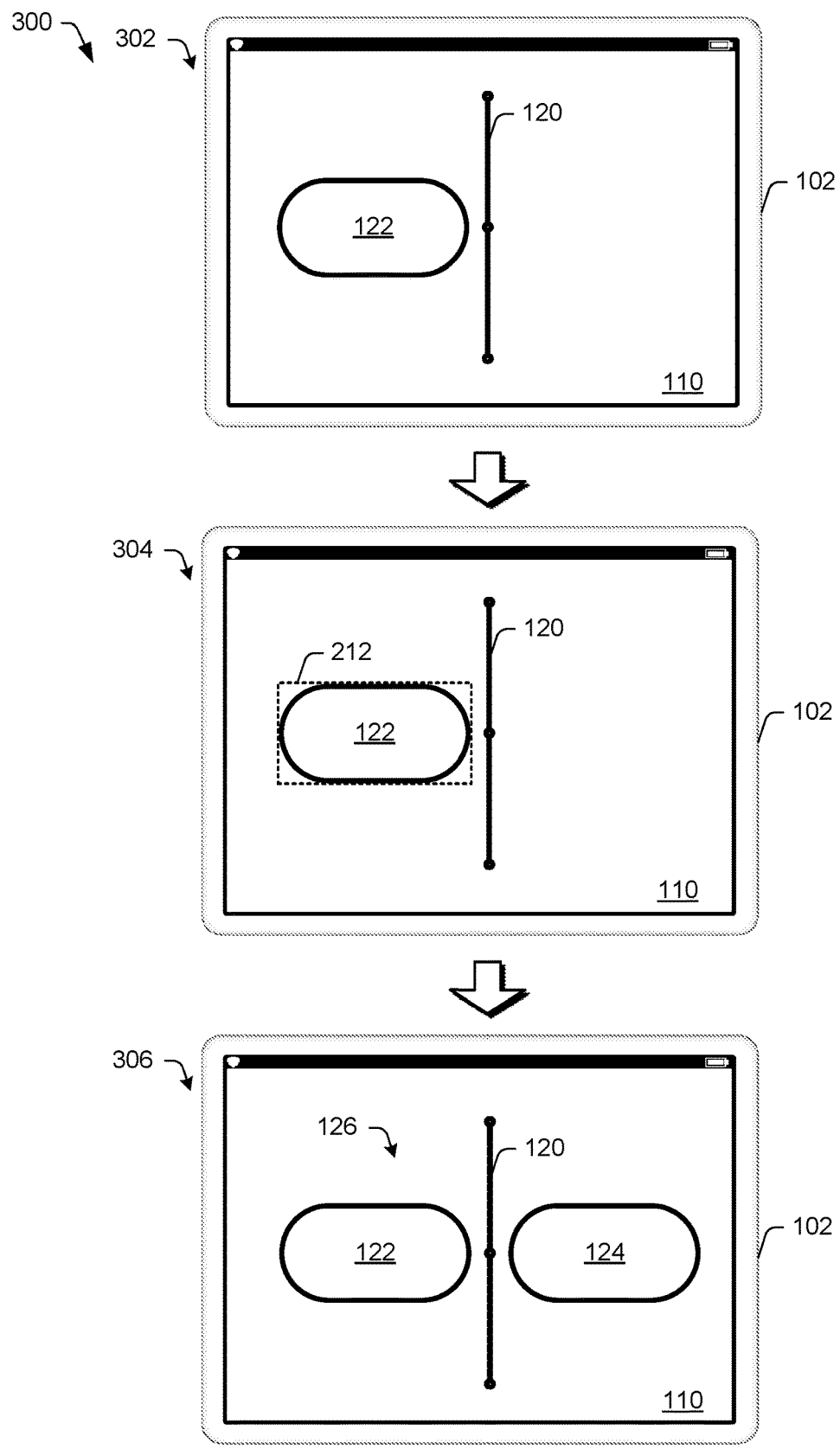
FIG. 3 depicts a system in an example implementation including first, second, and third stages depicting generation of a reflected object based on a source object having a bounding area that does not intersect a symmetry axis.

An example of this is illustrated in the system 300 of FIG. 3 depicted using first, second, and third stages 302, 304, 306. At the first stage 302, the source object 122 is defined in relation to a symmetry axis 120 in the user interface 110. At the second stage 304, a bounding area 212 is calculated by a bounding area calculation module 210 as previously described.

A determination is then made that the bounding area 212 does not intersect the bounding area 212 by the intersection determination module 214, a result of which is output as intersection data 216. In response, the path calculation module 218 generates the path 220 as coinciding with the bounding area 212. The reflected object generation module 222 then generates the reflected object 124 as an entirety of the source object 122 from within the bounding area 212 at a corresponding location, size, and rotation on an opposing side of the symmetry axis as illustrated at the third stage 306.

If "yes" from decision block 1402, the intersection determination module 214 ascertains, responsive to the determining, in this example that the source object 122 does not intersect the symmetry axis ("no" from decision block 1406). This determination is used as a basis to generate intersection data 216 that causes the path calculation module 218 to calculate the path 220 as also including an entirety of the bounding area 212 (block 1408).

Figure 4:
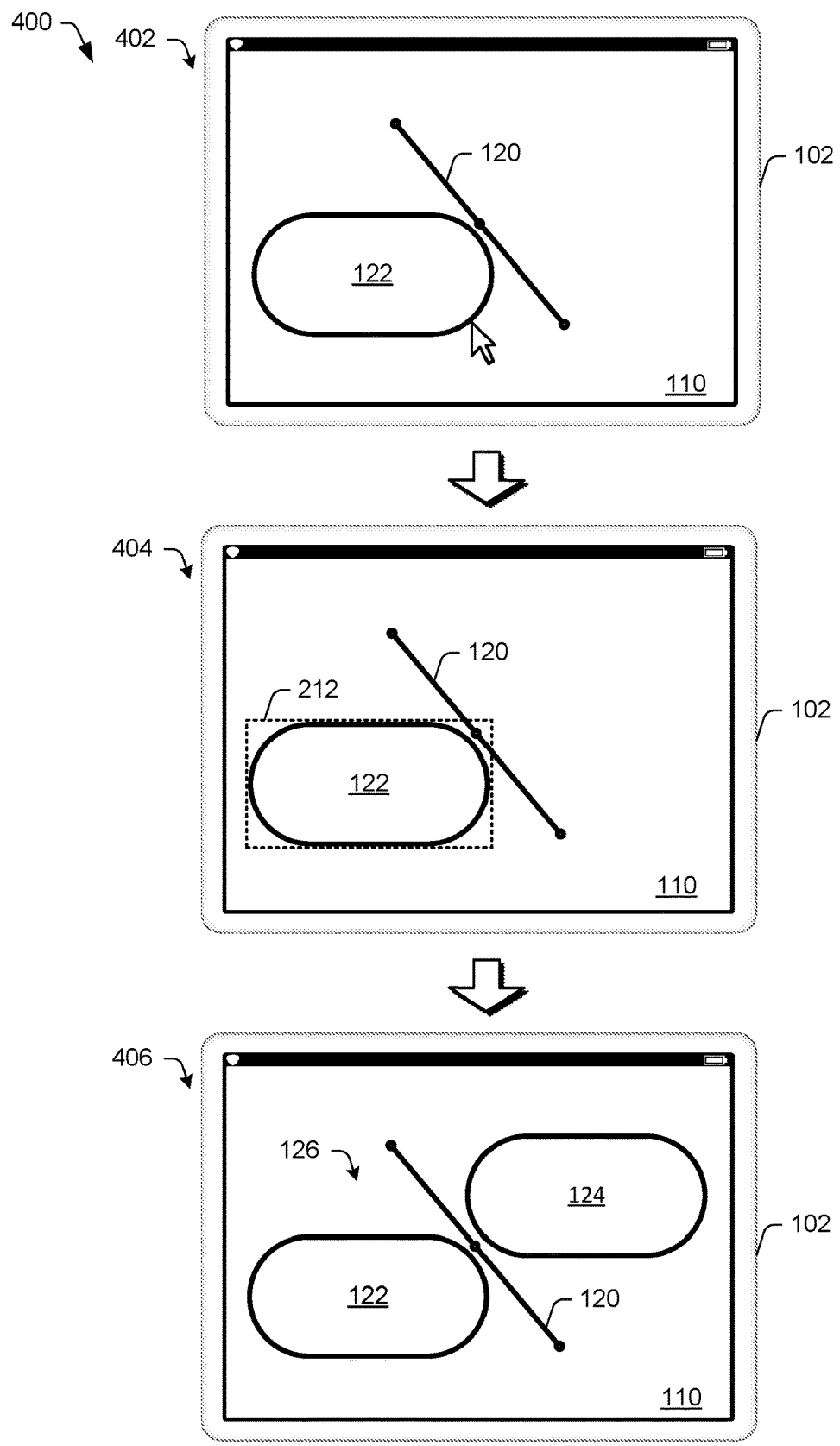
FIG. 4 depicts a system in an example implementation including first, second, and third stages depicting generation of a reflected object based on a source object that does not intersect a symmetry axis.

An example of this is illustrated in the system 400 of FIG. 4 depicted using first, second, and third stages 402, 404, 406. At the first stage 402, the source object 122 is defined in relation to a symmetry axis 120 in the user interface 110. At the second stage 404, a bounding area 212 is also calculated by a bounding area calculation module 210 as previously described.

A determination is then made by the intersection determination module 214 that the bounding area 212 does not intersect the source object 122, a result of which is output as intersection data 216. In this example, some portions of the bounding area 212 include part of the user interface 110/ digital content 106 that are not part of the source object 122. Therefore, it is possible to intersect the bounding area 212 without intersecting the source object 122. To address this, if intersection with the bounding area 212 is detected, the intersection determination module 214 also ascertains whether the source object 122 is intersected by the symmetry axis 120.

If not ("no" from decision block 1406), the path calculation module 218 generates the path 220 as coinciding with the bounding area 212 (block 1408). The reflected object generation module 222 then generates the reflected object 124 as an entirety of the source object 122 from within the bounding area 212 at a corresponding location, size, and rotation on an opposing side of the symmetry axis as illustrated at the third stage 406.

If so ("yes" from decision block 1406), the path calculation module 218 calculates an intersecting portion of the symmetry axis 120 with the bounding area 212 to calculate the path 220 (block 1410), which is then output (block 1412) to generate the reflected object 124. In this way, the path 220 defines which portion of the source object 122 is reflected to generate the reflected object 124 and thus form the symmetry art 126.

Figure 5:
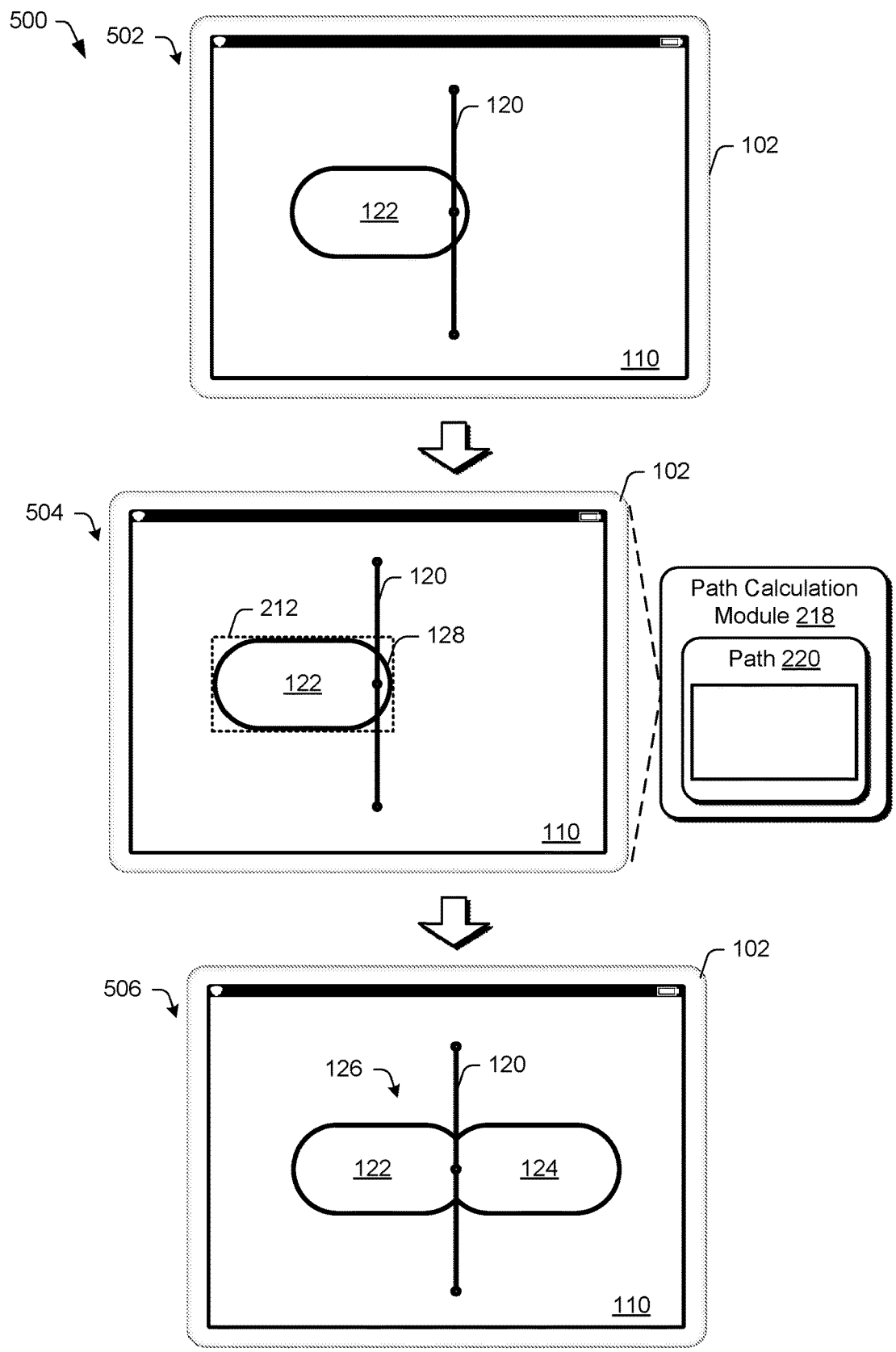
FIG. 5 depicts a system in an example implementation including first, second, and third stages depicting generation of a reflected object based on a source object that does intersect a symmetry axis.

An example of this is illustrated in the system 500 of FIG. 5 depicted using first, second, and third stages 502, 504, 506. At the first stage 502, as before, the source object 122 is defined in relation to a symmetry axis 120 in the user interface 110. At the second stage 504, a bounding area 212 is also calculated by a bounding area calculation module 210 as previously described.

In this example, however, the intersection determination module 214 generates intersection data 216 indicating that the symmetry axis 120 intersects the source object 122. In response, the path calculation module 218 calculates the path 220 based on a portion of the bounding area 212 disposed on a particular side of the symmetry axis 120 and an intersecting portion of the symmetry axis 120 with the bounding area 212. Therefore, the path 220 does not include a portion 128 of the bounding area 212 disposed on an opposing side of the symmetry axis 120.

As previously described, the path 220 is then used as a clipping window 224 to define which pixels of the source object 122 are reflected to form the reflected object 124. This also reduces an amount of computational resources utilized by the computing device 102 in implementing these techniques and supports real time user interaction, which is not possible in other techniques.

As part of calculating the intersecting portion, the path calculation module 218 is also configured to take into account a rotation angle of the symmetry axis (block 1414), a location of the symmetry axis 120 with respect to the source object 122 (block 1416), and so forth. The path calculation module 218, for instance, is configured to determine which of a plurality of portions (e.g., quadrants) are intersected by the symmetry axis 120 and a rotation angle of the axis to determine which portion of the source object 122 is to be reflected to generate the reflected object 124.

Figure 6:
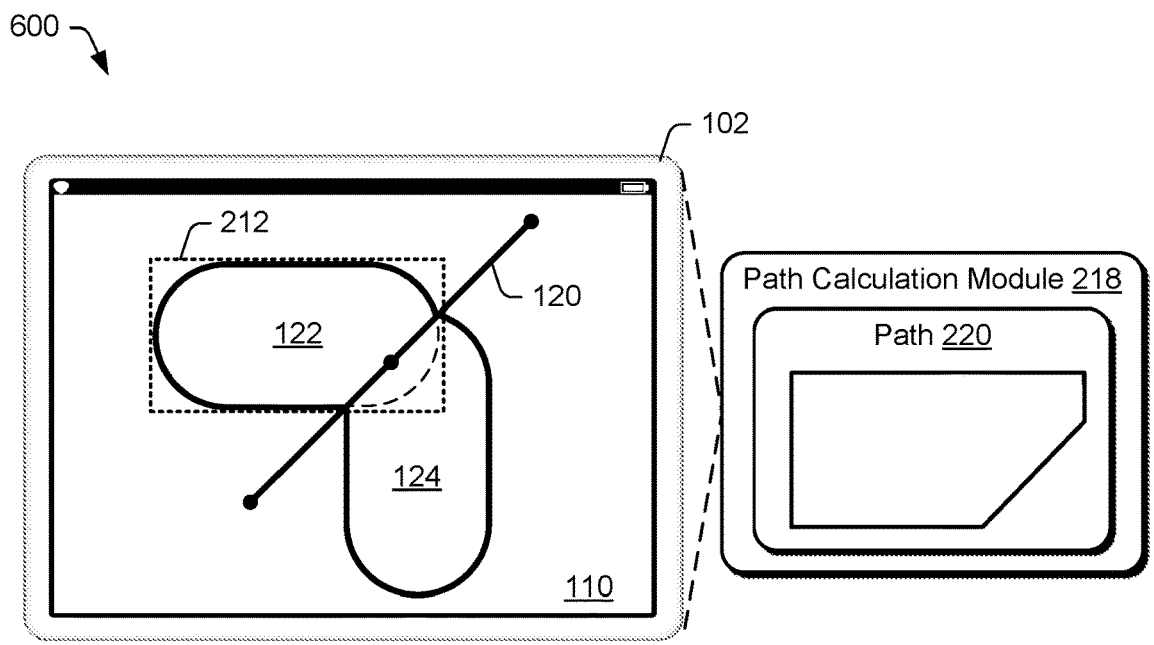
FIG. 6 depicts a system in a first example showing operation of a path calculation module of FIG. 2 to generate a path based on intersection of a bounding area and a symmetry axis based on an axis angle in a first quadrant.

In a first such example system 600 as shown in FIG. 6, the path calculation module 218 generates a path 220 based on intersection of a bounding area 212 and a symmetry axis 120 based on an axis angle in a first quadrant of the source object 122. This example illustrates the first axis as being located in a lower-right quadrant of the source object 122 had having an angle of rotation between zero degrees and one hundred and eighty degrees. Therefore, intersection points are appended in a clockwise manner resulting in the path 220 in which a lower right of the source object 122 is removed. The remaining portions of the bounding area 212 and intersection with the symmetry axis 120 are then used as the clipping window to generate the reflected portion 124.

Figure 7:
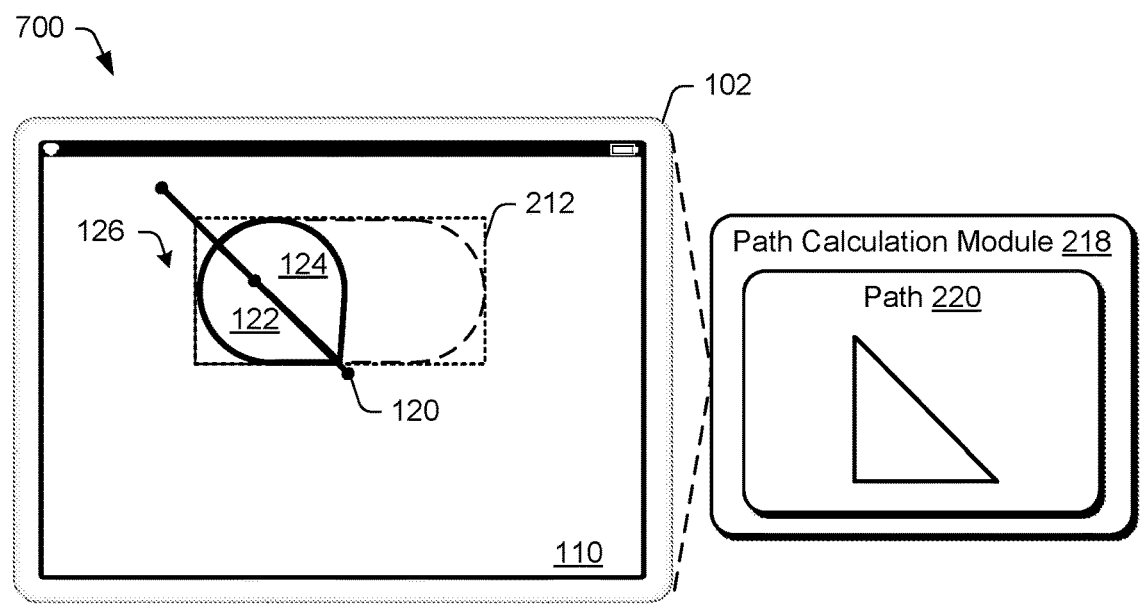
FIG. 7 depicts a system in a second example showing operation of a path calculation module of FIG. 2 to generate a path based on intersection of a bounding area and a symmetry axis based on an axis angle in a second quadrant.

In a second example system 700 as shown in FIG. 7, the path calculation module 218 generates a path 220 based on intersection of a bounding area 212 and a symmetry axis 120 based on an axis angle in a second quadrant of the source object 122. This example illustrates the first axis as being located in an upper-left quadrant of the source object 122 had having an angle of rotation between one hundred and eighty degrees and three hundred and sixty degrees. Therefore, intersection points are appended in a counterclockwise direction resulting in the path 220 in which a right side of the source object 122 is removed. The remaining portions of the bounding area 212 and intersection with the symmetry axis 120 are then used as the clipping window 224 to generate the reflected portion 124.

Figure 8:
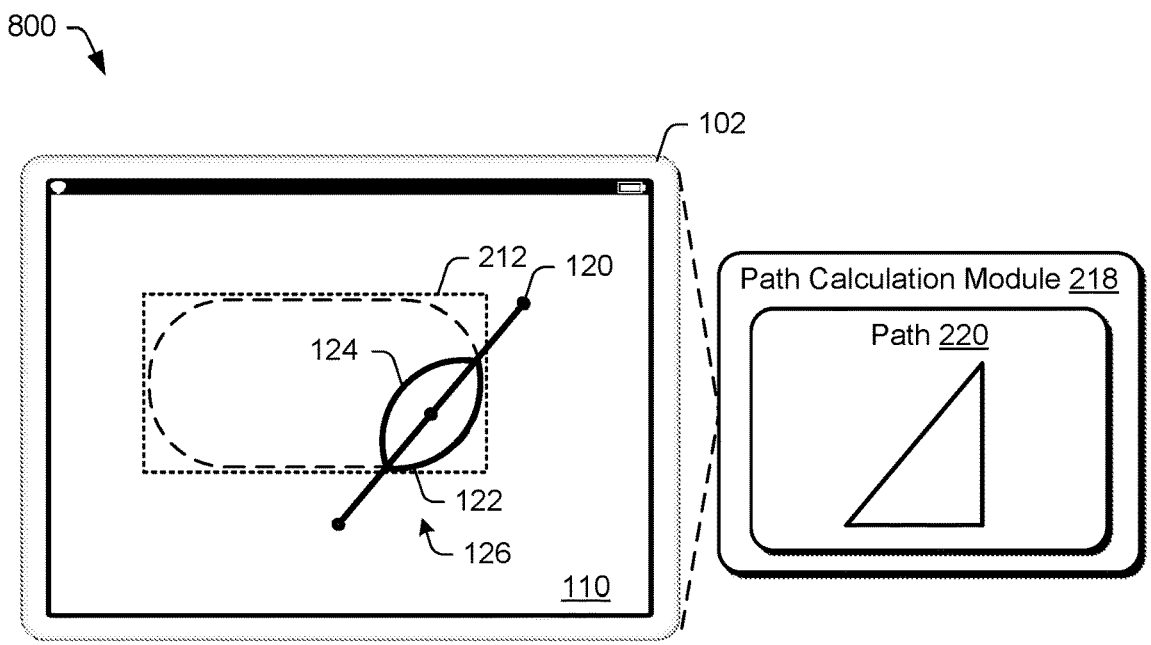
FIG. 8 depicts a system in a third example showing operation of a path calculation module of FIG. 2 to generate a path based on intersection of a bounding area and a symmetry axis based on an axis angle in a third quadrant.

In a third example system 800 as shown in FIG. 8, the path calculation module 218 generates a path 220 based on intersection of a bounding area 212 and a symmetry axis 120 based on an axis angle in a third quadrant of the source object 122. This example illustrates the axis angle as being located in a lower-right quadrant of the source object 122 had having an angle of rotation an angle of rotation between one hundred and eighty degrees and three hundred and sixty degrees. Therefore, intersection points are appended in a counterclockwise direction resulting in the path 220 in which a left side of the source object 122 is removed. The remaining portions of the bounding area 212 and intersection with the symmetry axis 120 are then used as the clipping window 224 to generate the reflected portion 124.

Figure 9:
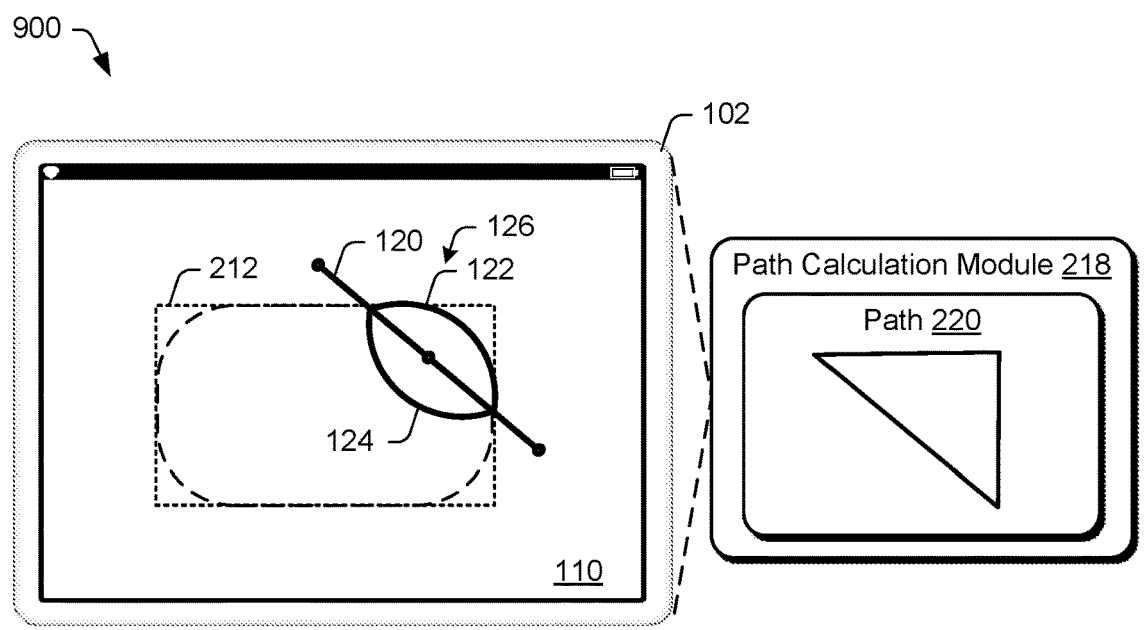
FIG. 9 depicts a system in a fourth example showing operation of a path calculation module of FIG. 2 to generate a path based on intersection of a bounding area and a symmetry axis based on an axis angle in a fourth quadrant.

In a fourth example system 900 as shown in FIG. 9, the path calculation module 218 generates a path 220 based on intersection of a bounding area 212 and a symmetry axis 120 based on an axis angle in a fourth quadrant of the source object 122. This example illustrates the axis angle as being located in an upper-right quadrant of the source object 122 had having an angle of rotation between one hundred and eighty degrees and three hundred and sixty degrees. Therefore, intersection points are appended in a counterclockwise direction resulting in the path 220 in which a left side of the source object 122 is removed. The remaining portions of the bounding area 212 and intersection with the symmetry axis 120 are then used as the clipping window 224 to generate the reflected portion 124.

An example of operation of the intersection determination module 214 and is described as follows.

```
• ComputeClippingPathPoints(master_art)
• {
    ○ var masterArtBounds = GetMasterArtBounds( )
    ○ var a, b, c = GetSymmetryAxisEquation(axisCenter, axisAngle)
    ○ // for each side of masterArtBounds, we want intersection points
      with axis line
    ○ var topLeft = {masterArtBounds.left, masterArtBounds.top}
    ○ var topRight = {masterArtBounds.right, masterArtBounds.top}
    ○ var bottomRight = {masterArtBounds.right,
      masterArtBounds.bottom}
    ○ var bottomLeft = {masterArtBounds.left, masterArtBounds.bottom}
    ○ // compute intersections with all edges
    ○ var  intersectTopEdge = IntersectionWithHorizontalLine(topLeft,
      topRight, a, b, c)
    ○ var  intersectRightEdge = IntersectionWithVerticalLine(topRight,
      bottomRight, a, b, c)
    ○ var  intersectBottomEdge =
      IntersectionWithHorizontalLine(bottomRight, bottomLeft, a, b, c)
    ○ var  intersectLeftEdge = IntersectionWithVerticalLine(bottomLeft,
      topLeft, a, b, c)
```

-continued

```
    ○ list pathPoints = [ ]
    ○ // if no actual intersection between master_art and axis then create
      path with
    ○ //masterArtBounds
    ○ if ( not DoesActuallyIntersect(master_art) )
    ○ {
        ■ pathPoints.append(topLeft, topRight, bottomRight, bottomLeft)
        ■ return pathPoints
    ○ }
    ○ // between a line and a rectangle, there can be at most two
      intersection points.
    ○ // So only two of
    ○ // the above have non-null values.
    ○ //insert both intersection points
    ○ pathPoints.append(intersectionPoint1)
    ○ pathPoints.append(intersectionPoint2)
    ○ if (axisAngle >= 0o and axisAngle <= 180o )
    ○ {
        ■ // append bounding box points in clockwise manner
        ■ pathPoints.append(bottomRight)
        ■ pathPoints.append(bottomLeft)
        ■ pathPoints.append(topLeft)
    ○ }
    ○ else
    ○ {
        ■ // append bounding box points in anti-clockwise manner
        ■ pathPoints.append(topRight)
        ■ }
        ■ return pathPoints
• }
```

An eexample of operation of the intersection module 214 is described as follows:

```
DoesActuallyIntersect(group_art):
    var doesActuallyIntersect = false
    For each art inside group_art:
        If art is a group (normal group or plugin group):
            If group_bounding_box intersects with axis_line:
                doesActuallyIntersect=DoesActuallyIntersect(art)
        Else if art is bezier path:
            if axis_line bezier intersects any of the path bezier
                doesActuallyIntersect = true
        Else // for all other types such as image, symbols, text etc
            If art_bounding box intersects with axis line:
                art_rotated_bounding_box=GetRotatedBoundingBox(art)
                If art_rotated_bounding_box intersects with
                axis_line:
                    doesActuallyIntersect = true
        if doesActuallyIntersect == true:
            return true
    return false
```

Figure 10:
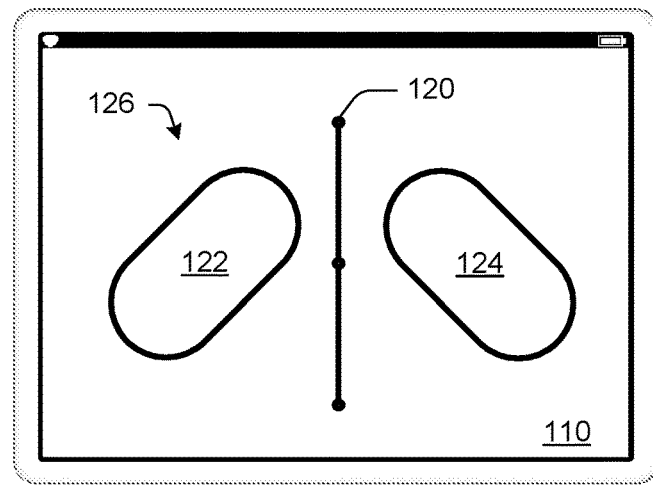
FIG. 10 depicts a system in an example of receipt of a user input and output of rotational movement of the source object and output of rotation of the reflected object in an opposite direction in real time as a user input is received.

The intersection determination module 214 is configured to address a wide variety of rotations of the source object 122 and/or symmetry axis. FIG. 10 depicts a system 1000 in an example of receipt of a user input and output of rotational movement of the source 122 and output of rotation of the reflected object 124 in an opposite direction in real time as the user input is received. FIG. 11 depicts a system 1100 in an example of receipt of a user input and output of rotation of an entirety of the symmetry art 126 in real time as the user input is received. FIG. 12 depicts a system 1200 in an example of receipt of a user input and output of rotation of the symmetry axis 120 and updating the source and reflected objects 122, 124 in real time as the user input is received.

For Bezier paths, the intersection determination module 214 computes intersection of actual Beziers with symmetry axis. But for other types of arts e.g. symbols, raster arts, plugin arts, text objects, this is not feasible. For these type of arts, the intersection determination module 214 computes a rotated tight bounding area which represents the actual area covered by the source object 122. With this rotated bounding area, the process of computing an intersection with symmetry axis 120 continues as described below.

The intersection determination module 214 is configured to generate intersection data 216 describing an intersection of horizontal and vertical edges of the bounding area 212 with the axis line as follows:

```
IntersectionWithHorizontalLine(point1, point2, a, b, c)
{
    // line ax+by +c=0 intersects line y=point1.y at x=(-c-b*y)/a
    // if a is zero, two lines are parallel or coinciding. So no intersection
    if(a==0)
        return none
    var y=pt1.v
    var x=(-c-b*y)/a
    var leftExtreme=std::min(point1.x, point2.x)
    var rightExtreme=std::max(point1.x, point2.x)
    // if point not in range, no intersection
    if (x<leftExtreme||x>rightExtreme)
        return none;
    return (x, y);
}
IntersectionWithVerticalLine(point1, point2, a, b, c)
{
    // line ax+by +c=0 intersects line x=point1.x at y=(-c-a*x)/b
    // if b is zero, two lines are parallel or coinciding. So no intersection
    if(b==0)
        return none
    var x=point1.x
    var y=(-c-a*x)/b
    var minExtreme=min(point1.y, point2.y)
    var maxExtreme=max(point1.y, point2.y)
    // if point not in range, no intersection
    if (y<minExtreme y>maxExtreme)
        return none;
    return (x, y)
}
```

In this way, the intersection data 216 is determined and passed to the path calculation module 218 to generate the path 220 that is to be used as a basis to render the symmetry art.

FIG. 15 is depicts a procedure 1500 in an example implementation of display of a user interface, receipt of a user input, and update of the user interface in real time as the user input is received. To begin, a user interface 110 is displayed that includes a first object, a second object, and a symmetry axis (block 1502). Example of which include the symmetry axis 120, the source object 122, and the reflected object 124.

A user input is received via the user interface 110 describing movement of at least one of the first object or the symmetry axis (block 1504). A cursor control device, for instance, is used to "click and drag" the source object 122 and/or the symmetry 120, rotate either of these, and so on.

In response to the user input, a bounding area of the first object is calculated (block 1506) based on the movement. This is performed as previously described by the bounding area calculation module 210.

A path 220 of the first object is determined based on the bounding area 212 and a result of determining whether the symmetry axis intersects the bounding area (block 1508), e.g., by a path calculation module 218.

The user interface 110 is then updated in real time as the user input is received by a reflected object generation module 22 and rendering module 208. The user interface 110 includes an updated first object as having a portion of the source object included within the path and an updated second object as having the portion of the first object reflected relative to the symmetry axis (block 1510). In this way, use of the path supports real time operation as user inputs are received, which is not possible in other techniques as previously described.

Example System and Device

Figure 16:
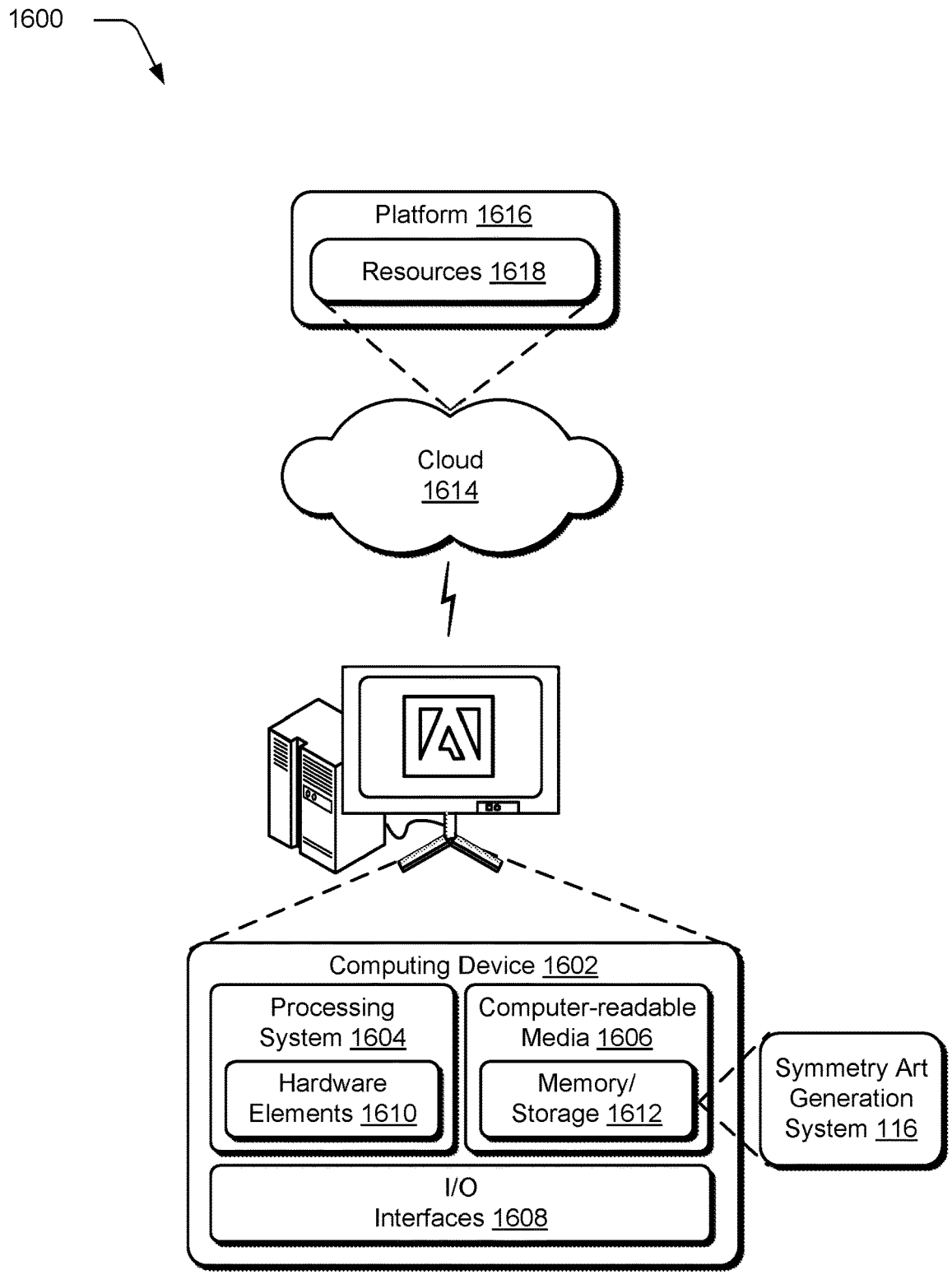
FIG. 16 illustrates an example system including various components of an example device that can be implemented as any type of computing device as described and/or utilize with reference to FIGS. 1-15 to implement embodiments of the techniques described herein.

FIG. 16 illustrates an example system generally at 1600 that includes an example computing device 1602 that is representative of one or more computing systems and/or devices that may implement the various techniques described herein. This is illustrated through inclusion of the symmetry art generation system 116. The computing device 1602 may be, for example, a server of a service provider, a device associated with a client (e.g., a client device), an on-chip system, and/or any other suitable computing device or computing system.

The example computing device 1602 as illustrated includes a processing system 1604, one or more computer-readable media 1606, and one or more I/O interface 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware element 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1606 is illustrated as including memory/storage 1612. The memory/storage 1612 represents memory/storage capacity associated with one or more computer-readable media. The memory/storage component 1612 may include volatile media (such as random access memory (RAM)) and/or nonvolatile media (such as read only memory (ROM), Flash memory, optical disks, magnetic disks, and so forth). The memory/storage component 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, modules, and examples described herein.

The techniques described herein may be supported by various configurations of the computing device 1602 and are not limited to the specific examples of the techniques described herein. This functionality may also be implemented all or in part through use of a distributed system, such as over a "cloud" 1614 via a platform 1616 as described below.

The cloud 1614 includes and/or is representative of a platform 1616 for resources 1618. The platform 1616 abstracts underlying functionality of hardware (e.g., servers) and software resources of the cloud 1614. The resources 1618 may include applications and/or data that can be utilized while computer processing is executed on servers that are remote from the computing device 1602. Resources 1618 can also include services provided over the Internet and/or through a subscriber network, such as a cellular or Wi-Fi network.

The platform 1616 may abstract resources and functions to connect the computing device 1602 with other computing devices. The platform 1616 may also serve to abstract scaling of resources to provide a corresponding level of scale to encountered demand for the resources 1618 that are implemented via the platform 1616. Accordingly, in an interconnected device embodiment, implementation of functionality described herein may be distributed throughout the system 1600. For example, the functionality may be implemented in part on the computing device 1602 as well as via the platform 1616 that abstracts the functionality of the cloud 1614.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium digital content creation environment, a method implemented by a computing device, the method comprising:
   calculating, by the computing device, a bounding area of a source object displayed within a user interface;
   determining, by the computing device, whether a symmetry axis defined in the user interface intersects the bounding area of the source object;
   calculating, by the computing device, a path based on the bounding area and a result of the determining whether the symmetry axis intersects the bounding area;
   generating, by the computing device, a reflected object based on a clipped portion of the source object clipped by the path, the reflected object located at an opposing side of the source object in relation to the symmetry axis and mirrors the clipped portion of the source object;
   rendering, in the user interface by the computing device, the reflected object and the portion of the source object included within the path; and
   updating, by the computing device in real time and responsive to a user input specifying movement of the symmetry axis or the portion of the source object, the user interface as including:
      an updated clipped portion of the source object calculated by determining an updated bounding area of the source object intersected by the symmetry axis resulting from the movement and an updated path based on the updated bounding area; and
      an updated reflected object located at an opposing side of the updated source object in relation to the symmetry axis and mirrors the updated clipped portion of the source object resulting from the movement.

2. The method as described in claim 1, wherein the result of the determining indicates that the symmetry axis does not intersect the bounding area and wherein the calculating of the path involves an entirety of the bounding area.

3. The method as described in claim 1, wherein the result of the determining indicates that the symmetry axis does intersect the bounding area and wherein, the method further comprises ascertaining, responsive to the determining of whether the symmetry axis defined in the user interface intersects the bounding area of the source object, whether the source object intersects the symmetry axis.

4. The method as described in claim 3, wherein a result of the ascertaining indicates that the symmetry axis does not intersect the source object and wherein the calculating of the path involves an entirety of the bounding area.

5. The method as described in claim 3, wherein when a result of the ascertaining indicates that the symmetry axis does intersect the source object, calculating an intersecting portion of the symmetry axis with the bounding area and wherein the calculated path includes the intersecting portion of the bounding area.

6. The method as described in claim 5, wherein the calculating of the intersecting portion of the symmetry axis with the bounding area includes calculating a rotation angle of the symmetry axis.

7. The method as described in claim 5, wherein the calculating of the intersecting portion of the symmetry axis with the bounding area includes calculating a rotation angle of the source object.

8. The method as described in claim 1, further comprising receiving the user input via the user interface as selecting the source object and wherein the calculating the bounding area, the determining of whether the symmetry axis defined in the user interface intersects the bounding area of the source object, the calculating the path, the generating the reflected object, and the rendering are performed automatically and without user intervention responsive to the receiving of the user input.

9. The method as described in claim 1, further comprising receiving the user input via the user interface to specify the movement of the portion of the source object or the symmetry axis and the rendering is performed in real time.

10. The method as described in claim 1, wherein the source object has an amount of display area that is less than an amount of display area of digital content that includes the source object.

11. The method as described in claim 1, wherein the bounding area is a bounding box and the path is a clipping path.

12. In a digital medium digital content creation environment, a method comprising:
   displaying, by a computing device, a user interface including a first object, a second object, and a symmetry axis;
   receiving, by the computing device, a user input specifying movement of at least one of the first object or the symmetry axis;
   calculating, responsive to the receiving of the user input by the computing device, a bounding area of the first object;
   determining, by the computing device, whether the symmetry axis resulting from the movement intersects the bounding area of the first object;
   calculating, by the computing device, a path based on the bounding area and a result of the determining whether the symmetry axis resulting from the movement intersects the bounding area;
   updating, by the computing device in real time as the user input is received, the user interface as including:
      an updated first object as having a clipped portion of the source first object clipped by the path; and
      an updated second object located at an opposing side of the updated first object in relation to the symmetry axis resulting from the movement and the updated second object mirrors the clipped portion of the first object clipped by the path.

13. The method as described in claim 12, wherein the result of the determining indicates that the symmetry axis does not intersect the bounding area and wherein the calculating of the path involves an entirety of the bounding area.

14. The method as described in claim 12, wherein the result of the determining indicates that the symmetry axis does intersect the bounding area and the determining further comprising ascertaining, responsive to the determining, whether the first object intersects the symmetry axis.

15. The method as described in claim 14, wherein a result of the ascertaining indicates that the symmetry axis does not intersect the first object and wherein the calculating of the path involves an entirety of the bounding area.

16. The method as described in claim 14, wherein when a result of the ascertaining indicates that the symmetry axis does intersect the first object, calculating an intersecting portion of the symmetry axis with the bounding area and wherein the calculated path includes the intersecting portion of the bounding area.

17. The method as described in claim 16, wherein the calculating of the intersecting portion of the symmetry axis with the bounding area includes calculating a rotation angle of the symmetry axis.

18. The method as described in claim 16, wherein the calculating of the intersecting portion of the symmetry axis with the bounding area includes calculating a rotation angle of the first object.

19. In a digital medium digital content creation environment, a system comprising:
  a processor; and
  a computer-readable storage medium having instructions stored thereon that, responsive to execution by the processor, causes the processor to perform operations including:
    calculating a bounding area of a source object displayed within a user interface;
    determining whether a symmetry axis defined in the user interface intersects the bounding area of the source object;
    calculating a path based on the bounding area and a result of the determining whether the symmetry axis intersects the bounding area;
    generating a reflected object based on a clipped portion of the source object clipped by the path, the reflected object located at an opposing side of the source object in relation to the symmetry axis and mirrors the clipped portion of the source object;
    rendering, in the user interface, the reflected object and the portion of the source object included within the path; and
    updating, in real time as a user input specifying movement of the symmetry axis or the portion of the source object is received, the user interface as including:
      an updated clipped portion of the source object calculated by determining an updated bounding area of the source object intersected by the symmetry axis resulting from the movement and an updated path based on the updated bounding area; and
      an updated reflected object located at an opposing side of the updated source object in relation to the symmetry axis and mirrors the updated clipped portion of the source object resulting from the movement.

20. The system as described in claim 19, the operations further comprising receiving the user input via the user interface and the rendering is performed in real time.

* * * * *